United States Patent
Yang et al.

(10) Patent No.: US 9,876,785 B2
(45) Date of Patent: Jan. 23, 2018

(54) SYSTEM AND METHOD FOR SAFE LOGIN, AND APPARATUS THEREFOR

(71) Applicant: ROWEM INC., Seoul (KR)

(72) Inventors: Giho Yang, Seoul (KR); Jaeyeob Hwang, Goyang-si (KR)

(73) Assignee: Rowem, Inc. (JP)

( * ) Notice: Subject to any disclaimer, the term of this patent is extended or adjusted under 35 U.S.C. 154(b) by 0 days.

(21) Appl. No.: 14/655,840

(22) PCT Filed: Dec. 27, 2013

(86) PCT No.: PCT/KR2013/012249
§ 371 (c)(1),
(2) Date: Jun. 26, 2015

(87) PCT Pub. No.: WO2014/104777
PCT Pub. Date: Jul. 3, 2014

(65) Prior Publication Data
US 2015/0341348 A1    Nov. 26, 2015

(30) Foreign Application Priority Data

Dec. 27, 2012 (KR) .......... 10-2012-0155630
Nov. 14, 2013 (KR) .......... 10-2013-0137982

(51) Int. Cl.
*G06F 7/04* (2006.01)
*H04L 29/06* (2006.01)
(Continued)

(52) U.S. Cl.
CPC .......... *H04L 63/0853* (2013.01); *G06F 21/31* (2013.01); *G06F 21/32* (2013.01);
(Continued)

(58) Field of Classification Search
CPC .............. G06F 21/33; H04L 9/3213
(Continued)

(56) References Cited

U.S. PATENT DOCUMENTS 5,915,025 A * 6/1999 Taguchi ............. G06F 12/145
                                                                380/44
6,092,192 A * 7/2000 Kanevsky ............ G06F 21/32
                                                                382/115
(Continued)

FOREIGN PATENT DOCUMENTS

CN        1917423 A      2/2007
CN      102664876 A      9/2012
(Continued)

OTHER PUBLICATIONS

International Search Report for International Application No. PCT/KR2013/012249 dated Jun. 9, 2014, 5 pages, Republic of Korea.

*Primary Examiner* — Anthony Brown
(74) *Attorney, Agent, or Firm* — Thorpe North & Western

(57) ABSTRACT

Disclosed is a safe log-in system and method for allowing log-in of a user in association with a plurality of devices, and an apparatus for the same. The safe log-in method for allowing a safe log-in of a communication device which accesses a web site includes: by an authentication data providing device, receiving a request for authentication-related data, which is required for log-in to the web site, from the communication device; by the authentication data providing device, extracting authentication-related data required for log-in to the web site; by the authentication data providing device, transmitting the extracted authentication-related data to the communication device; and by the communication device, attempting log-in authentication to the web site by using the authentication-related data.

12 Claims, 7 Drawing Sheets

(51) Int. Cl.
*G06F 21/34* (2013.01)
*G06F 21/32* (2013.01)
*G06F 21/31* (2013.01)

(52) U.S. Cl.
CPC .......... *G06F 21/34* (2013.01); *H04L 63/0428* (2013.01); *H04L 63/08* (2013.01); *H04L 63/0861* (2013.01)

(58) Field of Classification Search
USPC ............................................................ 726/7
See application file for complete search history.

(56) References Cited

U.S. PATENT DOCUMENTS

| | | | |
|---|---|---|---|
| 7,035,442 B2 | 4/2006 | Ha et al. | |
| 2003/0152254 A1 | 8/2003 | Ha et al. | |
| 2007/0043950 A1 | 2/2007 | Imanishi et al. | |
| 2007/0118891 A1 | 5/2007 | Buer | |
| 2008/0294896 A1* | 11/2008 | Noh | G06F 21/51 |
| | | | 713/168 |
| 2010/0151823 A1 | 6/2010 | Dagorn et al. | |
| 2011/0207433 A1* | 8/2011 | Miyamoto | G06F 21/41 |
| | | | 455/411 |
| 2012/0185697 A1 | 7/2012 | Buer | |
| 2014/0053257 A1 | 2/2014 | Buer | |
| 2014/0344160 A1 | 11/2014 | Buer | |

FOREIGN PATENT DOCUMENTS

| | | |
|---|---|---|
| JP | 2002-157226 | 5/2002 |
| JP | 2002-318788 | 10/2002 |
| JP | 2003-108525 | 4/2003 |
| JP | 2004-151863 | 5/2004 |
| JP | 2008-146551 | 6/2008 |
| KR | 2001-0000232 | 1/2001 |
| KR | 20030042789 | 6/2003 |
| KR | 2005-0112146 | 11/2005 |
| KR | 2006-0054527 | 5/2006 |
| KR | 2009-0013432 | 2/2009 |
| KR | 20120049466 | 5/2012 |
| WO | WO 2002/037403 | 5/2002 |

\* cited by examiner

SYSTEM AND METHOD FOR SAFE LOGIN, AND APPARATUS THEREFOR

TECHNICAL FIELD

The present disclosure relates to a log-in processing technique, and more particularly, to a safe log-in system and method for allowing log-in of a user in association with a plurality of devices, and an apparatus for the same.

BACKGROUND ART

Password authentication is used as a universal method for user authentication. In the password authentication, a user accesses a web server and sets his/her ID (identifier) and password, and then logs in the web server by inputting the set ID and password in a terminal. In addition, as an improvement of the existing password authentication, there has been proposed a technique for authenticating a user by using a touch pattern set by the user. Korean Unexamined Patent Publication No. 10-2009-0013432 discloses a portable terminal for authenticating a user by using a pattern and its locking and releasing method.

However if this method is used, the authentication information of the user, namely the password and ID of the user, may be captured by other persons by means of shoulder surfing. Further, if ID and password of a specific user are captured by others, personal data of the user may be continuously exposed to others unless the specific user changes the ID and password or withdraw from member.

SUMMARY

The present technology is directed to providing a safe log-in system and method for protecting authentication information of a user against hacking from outside such as shoulder surfing and reinforcing security of the authentication information, and an apparatus for the same.

In one aspect of the present disclosure, there is provided a safe log-in method for allowing a safe log-in of a communication device which accesses a web site, which includes: by an authentication data providing device, receiving a request for authentication-related data, which is required for log-in to the web site, from the communication device; by the authentication data providing device, extracting authentication-related data required for log-in to the web site; by the authentication data providing device, transmitting the extracted authentication-related data to the communication device; and by the communication device, attempting log-in authentication to the web site by using the authentication-related data.

In another aspect of the present disclosure, there is also provided a safe log-in method for allowing a safe log-in of a communication device which accesses a web site by using an authentication data providing device, the method including: receiving a request for authentication-related data, which is required for log-in to the web site, from the communication device; extracting log-in authentication information of the communication device, which is required for log-in to the web site; and transmitting the extracted log-in authentication information to the web site so that the web site performs log-in authentication of the communication device.

In another aspect of the present disclosure, there is also provided a safe log-in system, which includes a first communication device configured to extract authentication-related data of a second communication device and transmit the authentication-related data to the second communication device, when authentication-related data required for log-in to a web site is requested by the second communication device; a second communication device configured to acquiring log-in authentication information of the web site, based on the authentication-related data received from first communication device; and a web server configured to receive the log-in authentication information acquired by the second communication device and perform log-in authentication of the second communication device based on the received log-in information.

In another aspect of the present disclosure, there is also provided a safe log-in system, which includes a second communication device which accesses a web site; a first communication device configured to extract log-in authentication information of the second communication device for the web site, when authentication-related data required for log-in to the web site is requested by the second communication device; and a web server configured to receive log-in authentication information of the second communication device from the first communication device, and perform log-in authentication of the second communication device based on the log-in authentication information.

In another aspect of the present disclosure, there is also provided an authentication data providing device, which includes at least one processor; a memory; and at least one program stored in the memory and configured to be executed by the at least one processor, wherein the program includes: a data storage module configured to store authentication-related data; a data extracting module associated with the authentication data providing device to extract authentication-related data of the communication device from the data storage module when authentication-related data required for log-in to a web site is requested by a communication device which accesses the web site; and an authentication data providing module configured to transmit the authentication-related data extracted by the data extracting module to the web site or the communication device.

In the present disclosure, since a first communication device and a second communication device are associated to provide log-in authentication information to a web server, it is possible to protect the authentication information of a user against shoulder surfing and reinforce security of the authentication information of the user.

In addition, since the first communication device according to the present disclosure primarily performs user authentication and provides authentication-related data to the second communication device according to the user authentication result, it is possible to further reinforce security of the authentication information.

Further, since data required for log-in authentication is distributed and stored through a plurality of devices in the present disclosure, even though data of a specific device is maliciously captured by others, it is impossible to acquire the log-in authentication information of the user perfectly, and thus the authentication information of the user may be protected more safely.

BRIEF DESCRIPTION OF THE DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

DETAILED DESCRIPTION

The foregoing features and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Figure 1:
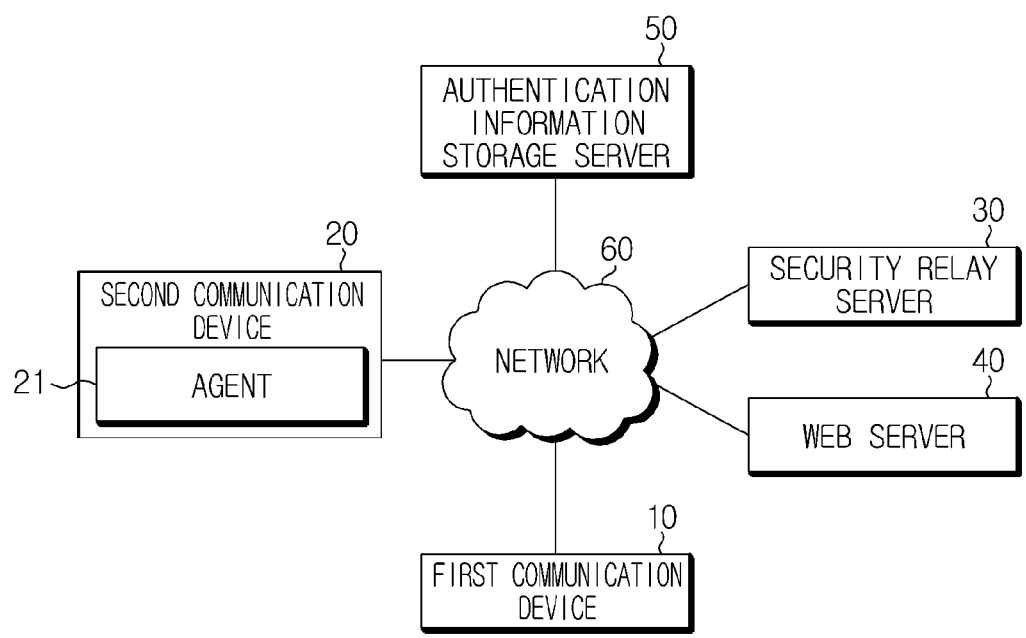
FIG. 1 is diagram showing a safe log-in system according to an embodiment of the present disclosure.

FIG. 1 is diagram showing a safe log-in system according to an embodiment of the present disclosure.

As shown in FIG. 1, the safe log-in system according to an embodiment of the present disclosure includes a first communication device 10, a second communication device 20, a security relay server 30, a web server 40 and an authentication information storage server 50.

The first communication device 10, the second communication device 20, the security relay server 30, the web server 40 and the authentication information storage server 50 communicate with each other through a network 60. Here, the network 60 includes a mobile communication network, a wired Internet network, a local wireless communication network or the like, and this is well known in the art and thus not described in detail here.

The web server 40 is a server for providing on-line service to users, for example a portal service, a financial service, an on-line shopping service, an electronic commerce service or the like, and the web server 40 stores authentication information of each user such as ID and password. In particular, when the second communication device 20 attempts log-in, the web server 40 receives log-in authentication information of the second communication device 20 from the first communication device 10 or the second communication device 20 and performs log-in authentication of the second communication device 20 based on the log-in authentication information.

The security relay server 30 stores a table in which at least one user identification information is mapped with identification information of the first communication device 10. At this time, the security relay server 30 may store any one of a phone number of the first communication device 10, an IP address, a MAC address, and identification information of a safe log-in application installed at the first communication device 10, as the identification information of the first communication device 10, and may also store safe log-in service ID, a resident registration number of a user, an Internet personal identification number (I-PIN), a mobile communication phone number or the like, as user identification information.

In particular, if receiving the log-in notification message from the second communication device 20, the security relay server 30 checks identification information of the first communication device 10, which is mapped with the user identification information of the second communication device 20, and transmits the log-in notification message to the first communication device 10 having identification information. The security relay server 30 may transmit the log-in notification message as a push message.

The authentication information storage server 50 stores encrypted log-in authentication information of each site for each user. At this time, the authentication information storage server 50 sets a storage address of the log-in authentication information and stores encrypted log-in authentication information at the set storage address, respectively. In other words, the authentication information storage server 50 sets a unique storage address for each log-in authentication information and stores encrypted log-in authentication information at each set storage address. If the authentication information storage server 50 receives encrypted log-in authentication information from the user, the authentication information storage server 50 sets a storage address for the log-in authentication information and stores the log-in authentication information in a storage area at the set storage address. In addition, the authentication information storage server 50 provides the storage address storing log-in authentication information to the user, so that the storage address is stored in the first communication device 10 of the user.

The second communication device 20 attempts log-in to the web server 40, and an agent 21 for safe log-in service is loaded therein. The agent 21 checks may check location information of the second communication device 20 and include the location information in the service notification message. In addition, the agent 21 monitors whether the second communication device 20 performs log-in to a specific site, and if the second communication device 20 performs log-in to a specific site, the agent 21 generates a log-in notification message containing identification information of a web site to which log-in is attempted, identification information of a log-in user and identification information of the second communication device 20 and transmits the log-in notification message to the security relay server 30.

The agent 21 may output a menu for performing safe log-in according to the present disclosure to a web browser or web page, in addition to a general log-in menu. For example, the agent 21 may additionally output a safe log-in menu below the log-in menu of a web page.

In an embodiment, the second communication device 20 may store a decryption key and provide the decryption key to a designated first communication device 10. The second communication device 20 stores an inherent decryption key for decrypting the encrypted log-in authentication information stored in the first communication device 10.

In another embodiment, the second communication device 20 may receive encrypted authentication information from the first communication device 10, decrypt the authentication information by using a decryption key stored therein, and then perform log-in authentication to the web server 40 by using the decrypted authentication information.

In another embodiment, the second communication device 20 may store encrypted authentication information of each web site, receive a decryption key for decrypting the corresponding authentication information from the first communication device 10, decrypt the authentication information by using the decryption key, and provide the decrypted authentication information to the web server 40.

In addition, in another embodiment, the second communication device 20 may receive an authentication information storage address from the first communication device 10, and receive authentication information stored at the authentication information storage address from the authentication information storage server 50.

The second communication device 20 may employ any communication device capable of accessing the web server 40 via the network 60, without specific limitations, for example a desktop computer, a tablet computer, a notebook, a mobile communication terminal or the like. In addition, when a safe log-in application or plug-in is installed, the agent 21 may be loaded in the second communication device 20. Moreover, if a safe log-in script included in the web page is executed, the agent 21 may be loaded in the second communication device 20. Further, the agent 21 may also be implemented other scripts, web storages, or other programs or instructions such as cookies.

The first communication device 10 provides authentication-related data to the second communication device 20 or the web server 40. The authentication-related data includes at least one of a decryption key, log-in authentication information (for example, ID and password), and an authentication information storage address. In addition, if the first communication device 10 receives a log-in notification message from the security relay server 30, the first communication device 10 receives user authentication information (for example, bio information or the like) from the user. Here, if the received user authentication information is identical to the stored user authentication information, the first communication device 10 extracts authentication-related data and transmits the authentication-related data to the second communication device 20 or the web server 40.

In an embodiment, the first communication device 10 may classify and store security data recording log-in authentication information of each web site for identification information of each communication device. Also, after acquiring a decryption key from the second communication device 20, the first communication device 10 may decrypt log-in authentication information of the web site accessed by the second communication device 20 by using the decryption key and transmit the decrypted log-in authentication information to the web server 40 or the second communication device 20.

In another embodiment, the first communication device 10 may also classify and store security data in which log-in authentication information of each web site is encrypted and recorded for identification information of each communication device, and transmit log-in authentication information of a web site to be accessed by the second communication device 20 to the second communication device 20.

In another embodiment, the first communication device 10 may classify and store a decryption key used for decrypting the encrypted log-in authentication information for each communication device, and transmit a specific decryption key to the second communication device 20.

In another embodiment, the first communication device 10 may classify and store an authentication information storage address of each web site for identification information of each communication device. Also, the first communication device 10 may check a web site to be accessed by a user of the second communication device 20, and then provide the authentication information storage address storing authentication information of the web site to the second communication device 20.

The first communication device 10 is a tablet computer, a notebook, a mobile communication terminal, a server or the like, and preferably a smart phone. In addition, it is more preferable that the first communication device 10 and the second communication device 20 are possessed by the same user.

Figure 2:
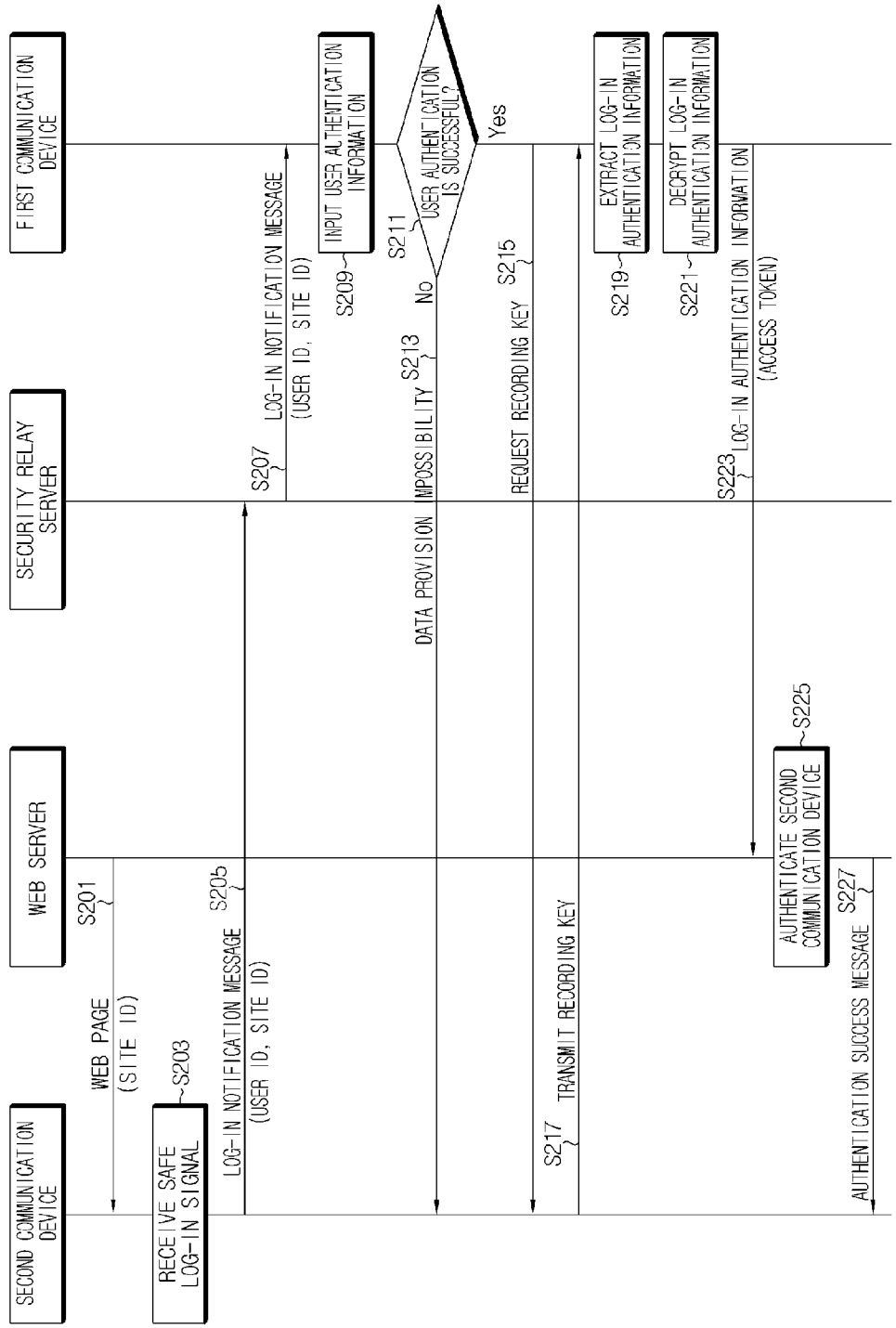
FIG. 2 is a flowchart for illustrating a method for log-in authentication in the safe log-in system according to an embodiment of the present disclosure.

FIG. 2 is a flowchart for illustrating a method for log-in authentication in the safe log-in system according to an embodiment of the present disclosure.

Referring to FIG. 2, the second communication device 20 accesses the web server 40 which is endowed with a web site address input by a user, and the web server 40 transmits a web page having a log-in menu, which allows an input of ID and password, to the second communication device 20 (S201). At this time, the web server 40 generates an access token, and transmits the access token and web site identification information (for example, a site address of the web server) to the second communication device 20 together with the web page. The access token is a kind of object in which security information required for performing log-in by the second communication device 20 is recorded, and has inherent identification information (for example, security identification information).

Next, the second communication device 20 outputs the web page received from the web server 40 on a screen. At this time, the agent 21 of the second communication device 20 may output a safe log-in menu below the log-in menu of the web page. If a nickname or ID of the safe log-in service is stored in a storage area such as cookies, the agent 21 of the second communication device 20 may display the nickname or ID on the web page together with the safe log-in menu.

Subsequently, the second communication device 20 monitors whether the safe log-in menu of the agent 21 is clicked, and if the safe log-in menu is clicked (S203), the second communication device 20 generates a log-in notification message, which includes identification information (for example, a web site address) of a web site to be logged in, an access token for allowing an access to the web server 40, user identification information and identification information of the second communication device 20, and transmits the log-in notification message to the security relay server 30 (S205). At this time, the agent 21 may record any one of a safe log-in service ID, a resident registration number of the user, an Internet personal identification number (I-PIN), a mobile communication phone number or the like in the log-in notification message as user identification information. Further, the agent 21 may record any one of its identification information (namely, agent identification information), an IP address of the second communication device 20, a MAC address or the like in the log-in notification message as identification information of the second communication device 20.

Then, the security relay server 30 checks the user identification information contained in the log-in notification message, and checks identification information of the first communication device 10 which is mapped with the user identification information. In addition, the security relay server 30 transmits the log-in notification message to the first communication device 10 having the checked identification information (S207).

Next, the first communication device 10 extracts the user identification information, the web site identification information, the access token and the identification information of the second communication device 20 from the log-in notification message received from the security relay server 30.

Subsequently, the first communication device 10 outputs a notification window for requesting user authentication and receives user authentication information from the user (S209). At this time, the first communication device 10 may receive a user authentication password preset by the user, or the first communication device 10 receives bio information such as a fingerprint, an iris or the like from the user through a camera or a bio information input unit.

Next, the first communication device 10 authenticates whether the user authentication information received from the user is identical to the user authentication information which has been received from the user in advance and stored therein (S211). If the user authentication information received from the user is not identical to the user authentication information stored therein, the first communication device 10 transmits a data provision impossibility message to the second communication device 20 to notify that the authentication-related data cannot be provided (S213). In other case, the first communication device 10 may output a message for requesting the user to input user authentication information again on the screen.

Meanwhile, if the user authentication information received from the user is identical to the user authentication information stored therein, the first communication device 10 requests a decryption key to the second communication device 20 (S215). Then, the second communication device 20 extracts a decryption key stored therein and transmits the decryption key to the first communication device 10 (S217).

Subsequently, the first communication device 10 checks the identification information of the second communication device and the web site identification information, contained in the log-in notification message, and extracts security data dedicated to the second communication device from the security data classified for each communication device based on the identification information of the second communication device. Next, the first communication device 10 extracts encrypted log-in authentication information (for example, ID and password) mapped with the web site identification information from the log-in authentication information included in the extracted security data (S219). Subsequently, the first communication device 10 decrypts the extracted log-in authentication information by using the decryption key (S221).

Next, the first communication device 10 checks the web site identification information and the access token extracted from the log-in notification message, and transmits the extracted log-in authentication information and the access token to the web server 40 endowed with the web site identification information (S223).

Then, the web server 40 recognizes the second communication device 20 attempting log-in, based on the access token received from the first communication device 10, and checks whether the log-in authentication information is accurate, thereby performing log-in authentication of the second communication device 20 (S225).

Next, if the log-in authentication is failed, the web server 40 treats that the log-in of the second communication device 20 is failed, but if the log-in authentication is successful, the web server 40 transmits an authentication success message to the second communication device 20 (S227), and then provides an on-line service requested by the second communication device 20. If the log-in authentication is successful, web server 40 notifies to the first communication device 10 that the second communication device 20 performs log-in successfully.

In addition, the first communication device 10 may transmit the decrypted log-in authentication information to the second communication device 20, instead of the web server 40. In this case, the second communication device 20 directly performs log-in authentication by transmitting the log-in authentication information received from the first communication device 10 to the web server 40.

Hereinafter, in the description with reference to FIGS. 3 to 5, each step (S201 to S215) indicated by the same reference symbol as in FIG. 2 is substantially identical to that of FIG. 2 and thus is not described in detail here.

Figure 3:
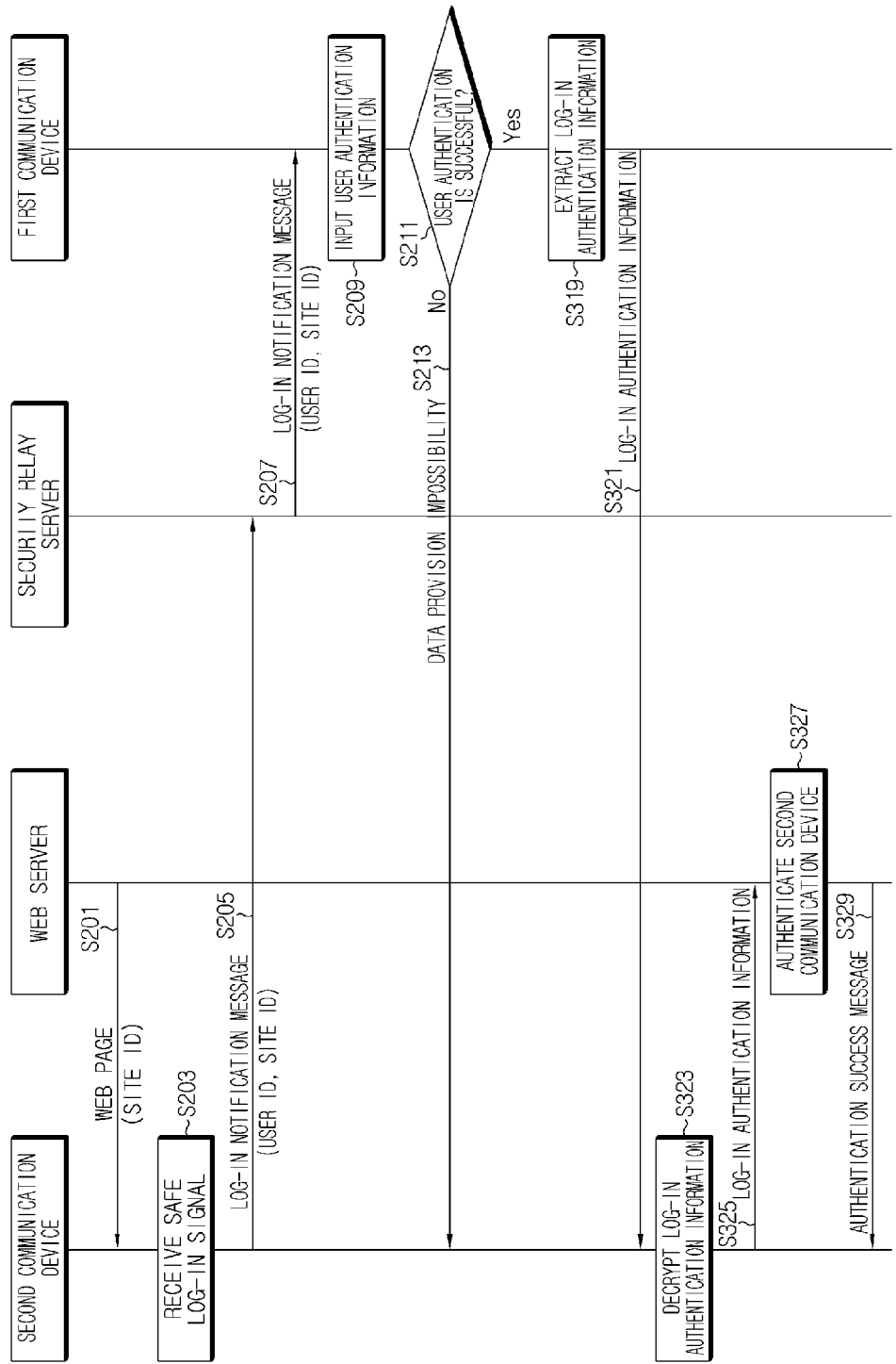
FIG. 3 is a flowchart for illustrating a method for log-in authentication in a safe log-in system according to another embodiment of the present disclosure.

FIG. 3 is a flowchart for illustrating a method for log-in authentication in a safe log-in system according to another embodiment of the present disclosure.

Referring to FIG. 3, if the first communication device 10 successfully performs user authentication, the first communication device 10 extracts encrypted log-in authentication information stored therein (S319). In detail, the first communication device 10 checks the identification information of the second communication device and the web site identification information contained in the log-in notification message received in Step S207, and extracts security data dedicated to the second communication device from the security data classified for each communication device based on the identification information of the second communication device. Next, the first communication device 10 extracts encrypted log-in authentication information (for example, ID and password) mapped with the web site identification information from the log-in authentication information contained in the extracted security data. The encrypted log-in authentication information is normally decrypted using a decryption key stored in the second communication device 20.

Subsequently, the first communication device 10 transmits the extracted encrypted log-in authentication information to the second communication device 10 (S321).

Then, the second communication device 20 decrypts the encrypted log-in authentication information received from the first communication device 10 by using a decryption key stored therein (S323), and transmits the decrypted log-in authentication information to the web server 40 to request log-in authentication (S325).

Next, the web server 40 performs log-in authentication of the second communication device 20 by checking whether the log-in authentication information received from the second communication device 20 is accurate (S327).

Next, if the log-in authentication is failed, the web server 40 treats that the log-in of the second communication device 20 is failed, but if the log-in authentication is successful, the web server 40 transmits an authentication success message to the second communication device 20 (S329), and then provides an on-line service requested by the second communication device 20.

Figure 4:
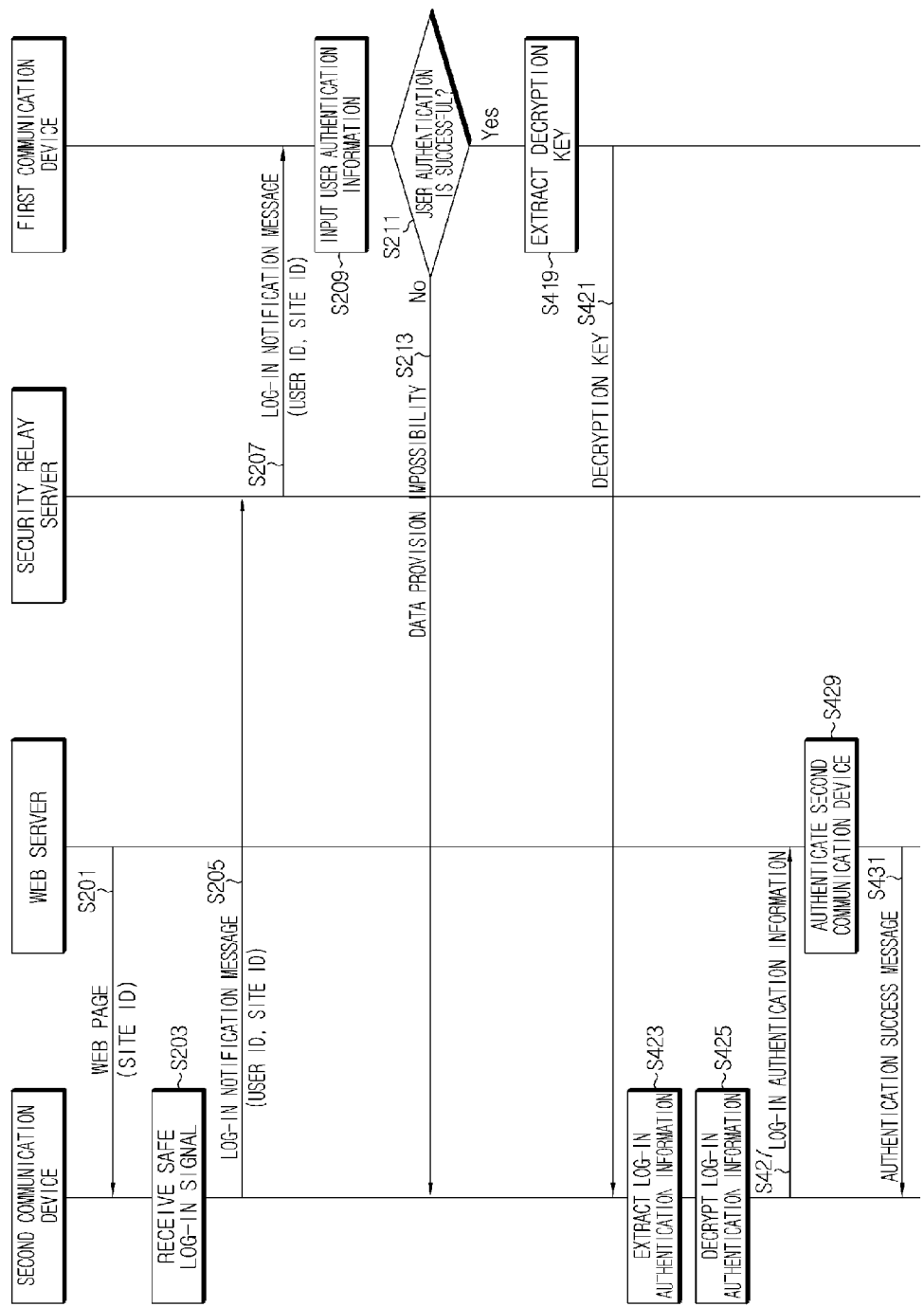
FIG. 4 is a flowchart for illustrating a method for log-in authentication in a safe log-in system according to another embodiment of the present disclosure.

FIG. 4 is a flowchart for illustrating a method for log-in authentication in a safe log-in system according to another embodiment of the present disclosure.

In the embodiment depicted in FIG. 4, the first communication device 10 stores a decryption key classified for each communication device, and the second communication device 20 stores encrypted log-in authentication information of each web site.

Referring to FIG. 4, if the first communication device 10 successfully performs user authentication, the first communication device 10 extracts a decryption key corresponding to the identification information of the second communication device contained in the log-in notification message from decryption key s classified for each communication device (S419). Subsequently, the first communication device 10 transmits the extracted decryption key to the second communication device 20 (S421).

Subsequently, the second communication device 20 extracts encrypted log-in authentication information mapped with identification information of a web site currently accessed, from encrypted log-in authentication information of each site stored therein (S423). Subsequently, the second communication device 20 decrypts the extracted log-in authentication information by using the decryption key received from the first communication device 10 (S425). Next, the second communication device 20 transmits the decrypted log-in authentication information to the web server 40 to request log-in authentication (S427).

Then, the web server 40 performs log-in authentication of the second communication device 20 by checking whether the log-in authentication information received from the second communication device 20 are accurate (S429). Next, if the log-in authentication is failed, the web server 40 treats that the log-in of the second communication device 20 is failed, but if the log-in authentication is successful, the web server 40 transmits an authentication success message to the second communication device 20 (S431), and then provides an on-line service requested by the second communication device 20.

Figure 5:
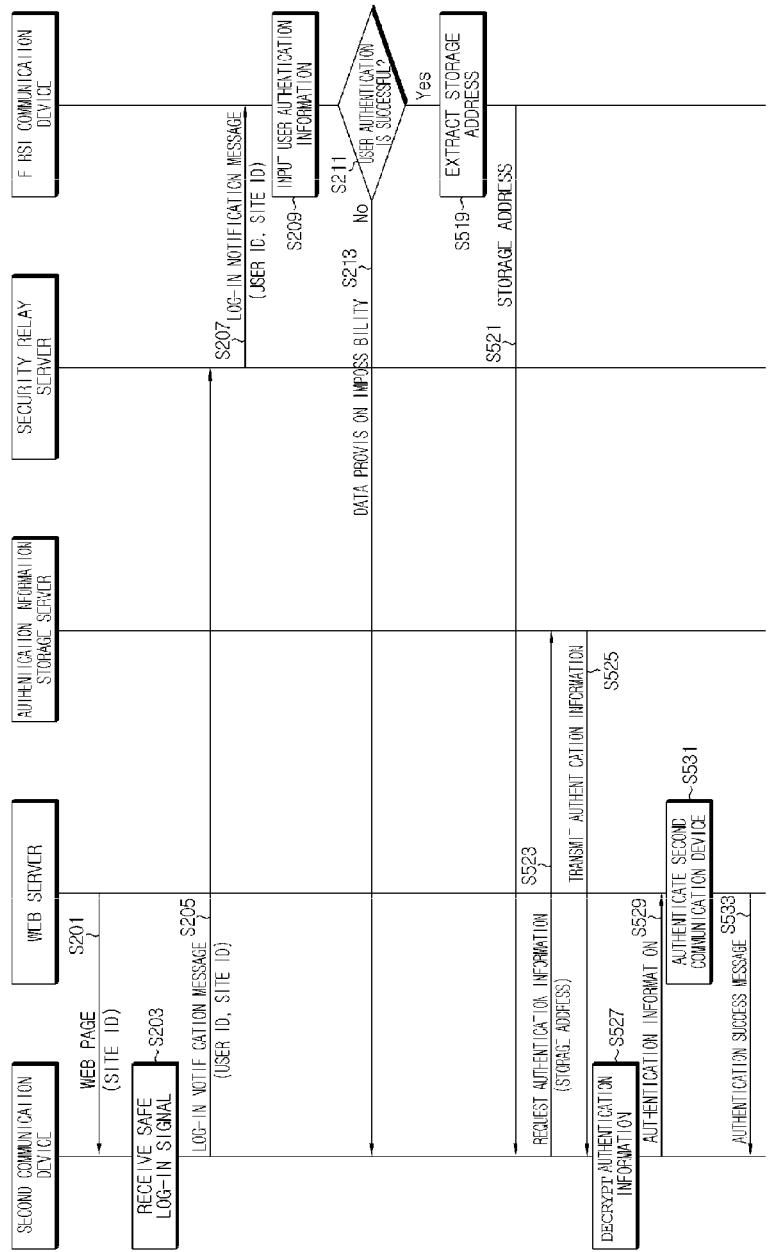
FIG. 5 is a flowchart for illustrating a method for log-in authentication in a safe log-in system according to another embodiment of the present disclosure.

FIG. 5 is a flowchart for illustrating a method for log-in authentication in a safe log-in system according to another embodiment of the present disclosure.

In the embodiment depicted in FIG. 5, the first communication device 10 classifies and stores an encrypted authentication information storage address of each web site for identification information of each communication device.

Referring to FIG. 5, if the first communication device 10 successfully performs user authentication, the first communication device 10 checks storage address data dedicated to the second communication device which attempts log-in, based on the identification information of the second communication device contained in the log-in notification message received in Step S207. In addition, the first communication device 10 extracts an encrypted authentication information storage address mapped with the site identification information contained in the log-in notification message from the checked storage address data dedicated to the second communication device (S519). The encrypted authentication information storage address is normally decrypted using a decryption key stored in the second communication device 20.

Subsequently, the first communication device 10 transmits the extracted encrypted authentication information storage address to the second communication device 20 (S521).

Then, the second communication device 20 extracts a decryption key stored therein and decrypts the encrypted authentication information storage address received from the first communication device 10 by using the decryption key. In addition, the second communication device 20 transmits the authentication information request message containing the storage address to the authentication information storage server 50 (S523).

If so, the authentication information storage server 50 checks the authentication information storage address in the authentication information request message, extracts encrypted log-in authentication information stored at the storage address, and transmits the encrypted log-in authentication information to the second communication device 20 (S525). In other words, the authentication information storage server 50 extracts log-in authentication information having the checked authentication information storage address from a plurality of log-in authentication information stored therein and transmits the log-in authentication information to the second communication device 20. The encrypted log-in authentication information is normally decrypted using a decryption key stored in the second communication device 20.

Subsequently, the second communication device 20 decrypts the encrypted authentication information received from the authentication information storage server 50 by using a decryption key stored therein (S527). Next, the second communication device 20 transmits the decrypted log-in authentication information to the web server 40 to request log-in authentication (S529).

If so, the web server 40 performs log-in authentication of the second communication device 20 by checking whether the log-in authentication information received from the second communication device 20 are accurate (S531). Next, if the log-in authentication is failed, the web server 40 treats that the log-in of the second communication device 20 is failed, but if the log-in authentication is successful, the web server 40 transmits an authentication success message to the second communication device 20 (S533), and then provides an on-line service requested by the second communication device 20.

Meanwhile, if the second communication device 20 performs log-in successfully, the second communication device 20 may be compulsorily logged out. In detail, after the second communication device 20 performs log-in successfully, if the first communication device 10 receives a log-out manipulation signal for the second communication device 20 from the user, the first communication device 10 transmits a message for requesting log-out of the second communication device 20 to the web server 40. At this time, the first communication device 10 includes an access token extracted from the log-in notification message into the log-out request message.

If so, the web server 40 identifies the second communication device 20 whose log-in is successful based on the access token contained in the log-out request message, and performs compulsory log-out of the second communication device 20. The web server 40 transmits a message notifying the log-out to the second communication device 20, and also notifies to the first communication device 10 that the second communication device 20 logs out.

Figure 6:
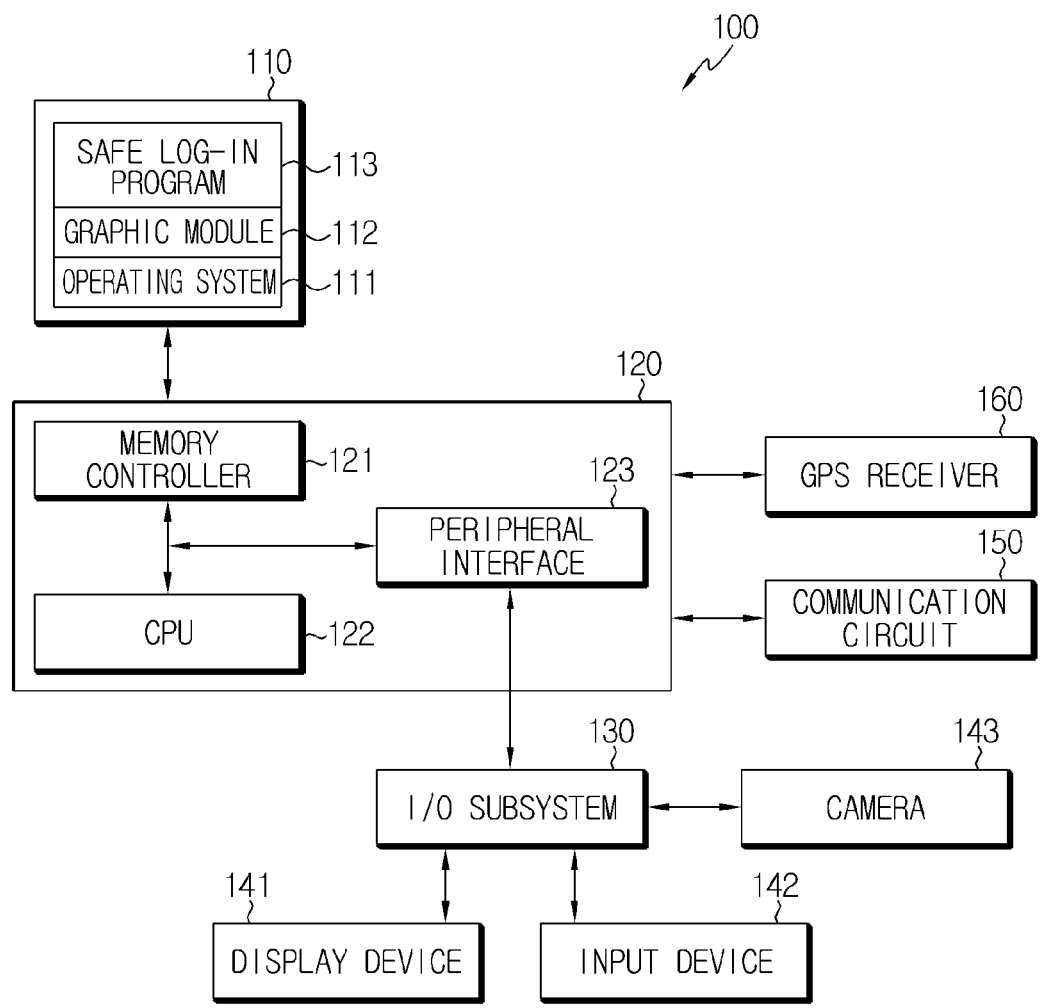
FIG. 6 is diagram showing an authentication data providing device according to an embodiment of the present disclosure.

FIG. 6 is a diagram showing an authentication data providing device according to an embodiment of the present disclosure.

The authentication data providing device 100 depicted in FIG. 6 performs operations of the first communication device 10 illustrated in FIGS. 1 to 5.

As shown in FIG. 6, the authentication data providing device 100 according to an embodiment of the present disclosure includes a memory 110, a memory controller 121, at least one processor (CPU) 122, a peripheral interface 123, an input/output (I/O) subsystem 130, a display device 141, an input device 142, a camera 143, a communication circuit 150 and a GPS receiver 160. These components communicate through at least one communication bus or signal line. Various components depicted in FIG. 6 may be implemented as hardware, software, combination of hardware and software, including at least one signal processing and/or application specific integrated circuit.

The memory 110 may include a high-speed random access memory and may also include at least one magnetic disc storage device, a non-volatile memory such as a flash memory, or another non-volatile semiconductor memory device. In some embodiments, the memory 110 may further include a storage located far from at least one processor 122, for example, a network-attached storage device accessed to the communication circuit 150 through a communication network selected from the group consisting of Internet, intranet, LAN (Local Area Network), WLAN (Wide LAN), SAN (Storage Area Network) or combinations thereof. An access to the memory 110 by other components of the authentication data providing device 100 such as the processor 122 and the peripheral interface 123 may be controlled by the memory controller 121.

The peripheral interface 123 connects an input/output peripheral device to the processor 122 and the memory 110. At least one processor 122 executes various software programs and/or a set of instructions stored in the memory 110 to perform various functions for the authentication data providing device 100 and process data.

In some embodiment, the peripheral interface 123, the processor 122 and the memory controller 121 may be implemented on a single chip such as a chip 120. In some other embodiments, they may be implemented as individual chips.

The I/O subsystem 130 gives an interface between the peripheral interface 123 and peripheral input/output devices of the authentication data providing device 100 such as the display device 141, the input device 142 and the camera 143.

The display device 141 may use a liquid crystal display (LCD) or a light emitting polymer display (LPD), and this display device 141 may be a capacity-type, resistance-type or infrared-type touch display. The touch display gives an output interface and an input interface between a device and a user. The touch display displays a visual output to the user. The visual output may include texts, graphics, videos and their combinations. The visual output may partially or entirely correspond to a user interface target. The touch display forms a touch sensing surface for receiving a user input.

The input device 142 is an input means such as a keypad, a keyboard or the like and receives an input signal of the user.

The camera 143 has a lens and photographs peripheral images through the lens. In particular, the camera 143 may photograph bio information images of the user such as a fingerprint or an iris of the user.

The processor 122 is configured to perform operations and instructions associated with the authentication data providing device 100. For example, the processor 122 may control receipt and manipulation of input and output data between components of the authentication data providing device 100 by using instructions searched from the memory 110.

The communication circuit 150 transmits or receives wireless electronic waves through an antenna or transmits or receives data through a cable. The communication circuit 150 converts an electric signal into an electronic wave, or vice versa, and may communicate with a communication network, another mobile gateway or a communication device by means of the electronic wave. The communication circuit 150 includes, for example, an antenna system, an RF (Radio Frequency) transceiver, at least one amplifier, a tuner, at least one oscillator, a digital signal processor, a CODEC (Compression Decompression) chipset, a subscriber identity module (SIM) card, a memory or the like, but may also include any known circuit for performing such functions, without being limited to the above. The communication circuit 150 may communicate with other devices by means of Internet which is called World Wide Web (WWW), internet, and/or mobile communication networks, wireless LAN (Local Area Network), MAN (metropolitan area network) and/or local wireless communication. The wireless communication includes GSM (Global System for Mobile Communication), EDGE (Enhanced Data GSM Environment), WCDMA (wideband code division multiple access), CDMA (code division multiple access), TDMA (time division multiple access), VoIP (voice over Internet Protocol), Wi-MAX, LTE (Long Term Evolution), Bluetooth, zigbee, NFC (Near Field Communication) or other appropriate communication protocols, including communication protocols not yet developed at the filing date of this application, and may use any of various communication standards, protocols and techniques without being limited to the above.

The GPS (Global Positioning System) receiver 160 receives a satellite signal emitted from a plurality of artificial satellites. The GPS receiver 160 may adopt a C/A (Course/Acquisition) code pseudo-range receiver, a C/A-code carrier receiver, a P-code receiver, a Y-code receiver or the like.

Software components such as an operating system 111, a graphic module (a set of instructions) 112 and a safe log-in program (a set of instructions) 113, are loaded (installed) in the memory 110.

The operating system 111 may be a built-in operating system such as Darwin, RTXC, LINUX, UNIX, OS X, WINDOWS, VxWorks, Tizen, iOS or Android. The operating system 111 includes various software components and/or devices for controlling and managing general system tasks (for example, memory management, storage device control, power management or the like) and promotes communication among various hardware and software components.

The graphic module 112 includes various known software components for providing and displaying a graphic on the display device 141. The term "graphics" includes texts, web pages, icons, digital images, videos, animations or the like, without any limitation, and also includes all objects which can be displayed to the user.

If the second communication device 20 attempts log-in to the web server 40, the safe log-in program 113 acquires authentication-related data and provides the authentication-related data to the web server 40 or the second communication device 20. If a safe log-in application is installed, the safe log-in program 113 is loaded in the memory 110.

Figure 7:
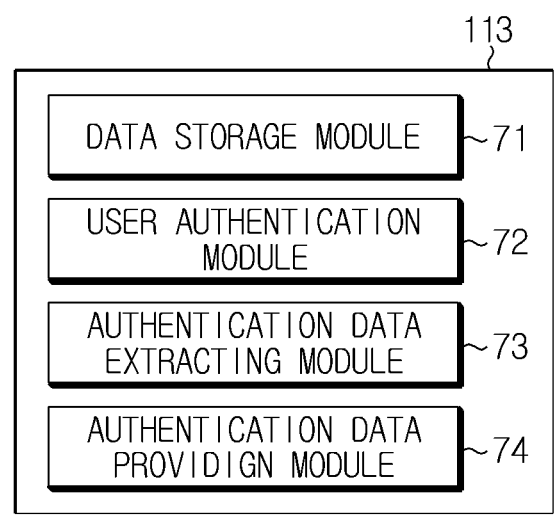
FIG. 7 is diagram showing a safe log-in program according to an embodiment of the present disclosure.

FIG. 7 is a diagram showing a safe log-in program according to an embodiment of the present disclosure.

As shown in FIG. 7, the safe log-in program 113 according to an embodiment of the present disclosure includes a data storage module 71, a user authentication module 72, an authentication data extracting module 73 and an authentication data providing module 74.

The data storage module 71 stores user authentication information. The data storage module 71 may store a password or bio information of the user as the user authentication information. In an embodiment, the data storage module 71 may classify and store security data, which records log-in authentication information (namely, ID and password) of each web site, for identification information of each communication device. The log-in authentication information is encrypted and stored in the data storage module 71 and is normally decrypted based on the decryption key stored in the second communication device 20. In another embodiment, the data storage module 91 may classify and store at least one decryption key for identification information of each communication device. In another embodiment, the data storage module 71 may classify and store security address data, which records an authentication information storage address of each web site, for identification information of each communication device.

The user authentication module 72 performs user authentication by checking whether the user authentication information received from the user is identical to the user authentication information stored in the data storage module 71. In other words, if the user authentication module 72 receives a log-in notification message from the security relay server 30 through the communication circuit 150, the user authentication module 72 outputs a notification window to the display device 141 to request an input of user authentication information. In addition, if user authentication information is input from the user, the user authentication module 72 checks whether the user authentication information is identical to the user authentication information stored in the data storage module 71. The user authentication module 72 may receive a password for user authentication from the user through the input device 142, and in this case, the user authentication module 72 authenticates whether the password input by the user is identical to a password stored in the data storage module 71. In addition, the user authentication module 72 may receive bio information of the user by means of the camera 143 or other bio information input units (not shown), and in this case, the user authentication module 72 may perform user authenticate by checking whether the bio information input by the user is identical to bio information stored in the data storage module 71 over a threshold value (for example, 70%).

If the user authentication module 72 successfully performs user authentication, the authentication data extracting module 73 extracts authentication-related data from the data storage module 71. The authentication data extracting module 73 may check security data dedicated to the second communication device from a plurality of security data in the data storage module 71 based on the identification information of the communication device, contained in the log-in notification message, and extract encrypted log-in authentication information (namely, ID and password) mapped with the web site identification information from the security data as authentication-related data.

In another embodiment, the authentication data extracting module 73 may extract a decryption key corresponding to the identification information of the second communication device 20 from the data storage module 71 as the authentication-related data, based on the identification information of the second communication device contained in the log-in notification message.

In another embodiment, the authentication data extracting module 73 may check a storage address data dedicated to the second communication device from the data storage module 71, based on the identification information of the second communication device contained in the log-in notification message, and extract an authentication information storage address mapped with the web site identification information from the storage address data as the authentication-related data.

The authentication data providing module 74 provides the authentication-related data extracted by the authentication data extracting module 73 to the web server 40 or the second communication device 20. In an embodiment, the authentication data providing module 74 requests and receives a decryption key to/from the second communication device 20 by using the communication circuit 150, decrypts the encrypted log-in authentication information extracted by the authentication data extracting module 73 using a decryption key, and then transmits the decrypted log-in authentication information to the web server 40 or the second communication device 20. In another embodiment, the authentication data providing module 74 transmits the encrypted log-in authentication information extracted by the authentication data extracting module 73 to the second communication device 20 by using the communication circuit 150, so that the encrypted log-in authentication information is decrypted using a decryption key stored in the second communication device 20.

In another embodiment, the authentication data providing module 74 transmits the decryption key extracted by the authentication data extracting module 73 to the second communication device 20 through the communication circuit 150, so that the encrypted log-in authentication information stored in the second communication device 20 is decrypted using the transmitted decryption key. In another embodiment, the authentication data providing module 74 transmits the encrypted authentication information storage address extracted by the authentication data extracting module 73 to the second communication device 20, so that the second communication device 20 receives the log-in authentication information stored at the authentication information storage address from the authentication information storage server 50.

As described above, in the present disclosure, the first communication device 10 and the second communication device 20 are associated to provide log-in authentication information to the web server 40, which allows ID and password of the user to be protected against shoulder surfing and also reinforces security of authentication information of the user. In addition, since the first communication device 10 according to the present disclosure primarily performs user authentication and provides authentication-related data to the second communication device 20 according to the user authentication result, it is possible to further reinforce security of the authentication information. Further, since data required for log-in authentication is distributed and stored through a plurality of devices in the present disclosure, even though data of a specific device is maliciously captured by others, it is impossible to acquire the log-in authentication information of the user perfectly, and thus the authentication information of the user may be protected more safely.

While this specification contains many features, the features should not be construed as limitations on the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A safe log-in method for allowing a safe log-in of a communication device which accesses a web site, the method comprising:
    by a security relay server, receiving a log-in notification message including identification information of the web site and user identification information from the communication device to identify an authentication data providing device mapped with the user identification information;
    by the security relay server, transmitting the log-in notification message to the identified authentication data providing device;
    by the authentication data providing device, extracting encrypted log-in authentication information required for log-in to the web site, from encrypted log-in authentication information stored therein corresponding to the identification information of the website;
    by the authentication data providing device, transmitting authentication-related data including the extracted encrypted log-in authentication information to the communication device; and
    by the communication device, decrypting the encrypted log-in authentication information included in the authentication-related data by using a decryption key stored therein, and attempting log-in authentication to the web site by using the decrypted log-in authentication information.

2. A safe log-in method for allowing a safe log-in of a communication device which accesses a web site, the method comprising:
    by a security relay server, receiving a log-in notification message including identification information of the web site and user identification information from the communication device to identify an authentication data providing device mapped with the user identification information;
    by the security relay server, transmitting the log-in notification message to the identified authentication data providing device;
    by the authentication data providing device, extracting a decryption key as the authentication-related data required for log-in to the web site,
    by the authentication data providing device, transmitting the extracted decryption key to the communication device, and
    by the communication device, decrypting encrypted log-in authentication information stored therein by using the decryption key received from the authentication data providing device, and attempting log-in authentication to the web site by using the decrypted log-in authentication information.

3. A safe log-in method for allowing a safe log-in of a communication device which accesses a web site, the method comprising:
    by a security relay server, receiving a log-in notification message including identification information of the web site and user identification information from the communication device to identify an authentication data providing device mapped with the user identification information;
    by the security relay server, transmitting the log-in notification message to the identified authentication data providing device;
    by the authentication data providing device, extracting an authentication information storage address mapped with the identification information of the web site;
    by the authentication data providing device, transmitting the extracted authentication information storage address to the communication device;
    by the communication device, checking the authentication information storage address included in the authentication-related data, and transmitting an authentication information request message including the authentication information storage address to an authentication information storage server;
    by the authentication information storage server, transmitting authentication information stored at the authentication information storage address to the communication device; and
    by the communication device, attempting log-in authentication to the web site by using the authentication information received from the authentication information storage server.

4. The safe log-in method according to claim 3, further comprising:
    by the communication device, decrypting the authentication information storage address included in the authentication-related data by using a decryption key stored therein.

5. The safe log-in method according to claim 1, further comprising:
    by the authentication data providing device, performing user authentication by receiving user authentication information from the user,
    wherein said transmitting of the authentication-related data includes transmitting the authentication-related data to the communication device when user authentication of the user is performed successfully.

6. The safe log-in method according to claim 5,
    wherein said performing of user authentication includes receiving bio information of the user and checking whether the received bio information is identical to bio information stored therein over a threshold value.

7. A safe log-in method for allowing a safe log-in of a communication device which accesses a web site, the method comprising:
    by a security relay server, receiving a log-in notification message including identification information of the web site and user identification information from the communication device to identify an authentication data providing device mapped with the user identification information;
    by the security relay server, transmitting the log-in notification message to the identified authentication data providing device;
    by the authentication data providing device, performing user authentication by receiving user authentication information from the user by means of an input device;

by the authentication data providing device, extracting log-in authentication information of the communication device, which is mapped with the identification information of the web site, when the user authentication of the user is performed successfully; and by the authentication data providing device, transmitting the extracted log-in authentication information to the web site so that the web site performs log-in authentication of the communication device, wherein said extracting of log-in authentication information includes:

requesting a decryption key to the communication device and receiving the decryption key therefrom; and extracting encrypted log-in authentication information and decrypting the extracted log-in authentication information by using the decryption key, and wherein said transmitting to the web site includes transmitting the decrypted log-in authentication information to the web site.

8. The safe log-in method according to claim 7, further comprising:

by the authentication data providing device, checking an access token of the communication device, which is endowed through the web site, wherein said transmitting to the web site includes transmitting the checked access token to the web site together with the log-in authentication information.

9. The safe log-in method according to claim 2, further comprising:

by the authentication data providing device, performing user authentication by receiving user authentication information from the user, wherein said transmitting of the authentication-related data includes transmitting the authentication-related data to the communication device when user authentication of the user is performed successfully.

10. The safe log-in method according to claim 3, further comprising:

by the authentication data providing device, performing user authentication by receiving user authentication information from the user, wherein said transmitting of the authentication-related data includes transmitting the authentication-related data to the communication device when user authentication of the user is performed successfully.

11. The safe log-in method according to claim 4, further comprising:

by the authentication data providing device, performing user authentication by receiving user authentication information from the user, wherein said transmitting of the authentication-related data includes transmitting the authentication-related data to the communication device when user authentication of the user is performed successfully.

12. The safe log-in method according to claim 7, wherein said performing of user authentication includes receiving bio information of the user and checking whether the received bio information is identical to bio information stored therein over a threshold value.

\* \* \* \* \*